United States Patent Office 2,831,831
Patented Apr. 22, 1958

2,831,831

COPOLYESTERS CONTAINING AROMATIC AMINO ACID DERIVATIVES

John R. Caldwell and Russell Gilkey, Kingsport, Tenn., assignors to Eastman Kodak Company, Rochester, N. Y., a corporation of New Jersey No Drawing. Application August 4, 1954
Serial No. 447,899

20 Claims. (Cl. 260—47)

This invention relates to polymeric materials, and particularly to fiber-forming linear polymers having improved dyeing properties.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U. S. Patent 2,071,250. The usual polyester fibers, such are those prepared from polyethylene terephthalate, are very difficult to dye, however, and special methods are usually employed in order to achieve any satisfactory degree of dyeing. Thus, at the present time, polyester fibers must be dyed at super atmospheric pressures with cellulose acetate dyes in order to obtain practical shades. This process requires the use of expensive equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly an object of this invention to provide new linear polyesters from which fibers can be prepared which have improved dye affinity, especially for cellulose acetate type dyes and acid wool dyes.

Another object of the invention is to provide new and improved linear polyesters containing an N-hydroxyalkyl derivative of an aromatic amino acid in the main molecular chain.

Another object of the invention is to provide new and improved polyesters suitable for the manufacture of fibers which can be dyed to practical shades under ordinary conditions with or without the use of super atmospheric pressures or dyeing assistants.

Another object of the invention is to provide a method for incorporating an N-hydroxyalkyl aromatic amino acid or ester thereof into high molecular weight, fiber-forming polyesters.

Another object of the invention is to improve the dyeing properties of polyester fibers without substantially altering the melting point, tensile strength, elongation, or elastic recovery of the fibers.

Other objects will be apparent from the description and claims which follow.

These and other objects are attained by means of this invention wherein improved polyesters are obtained by reacting together a dihydroxylic compound, such as a dihydric alcohol or an ester thereof, a polycarboxylic compound, such as a polybasic organic acid or an ester thereof, and an N-hydroxyalkyl derivative of an aromatic amino acid or an ester thereof, as hereinafter defined, and thereby forming a linear polyester of improved dyeing properties. The coreaction of dihydroxylic compounds and polycarboxylic compounds, whether free or esterified, to form linear condensation polymers, is well known in the art. This invention is concerned with obtaining modified condensation polymers of improved dyeing properties by coreacting with any of the well known combinations of dihydroxylic and polycarboxylic reactants, an N-hydroxyalkyl derivative of an aromatic amino acid having the formula

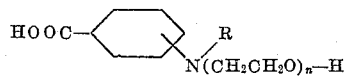

wherein R is either hydrogen or an alkyl group of 1 to 6 carbon atoms and $n$ is a whole number in the range of 1–10, or an alkyl ester of such acid wherein the alkyl group contains 1–10 carbon atoms, whereby the N-hydroxyalkyl derivative of the aromatic amino acid enters into the polymer chain in the same manner as do the other two bifunctional reactants to give a modified molecular structure which is much more susceptible to dyeing than are unmodified polyesters. In the N-hydroxyalkyl derivatives used in practicing this invention, the amino nitrogen is bonded directly to the aromatic nucleus either meta or para to the carboxylic group. As is well known in the art, the polyhydric alcohols and polybasic acids can be used in either the free or esterified form without affecting the polyester formation, and it will be understood that the term "dihydroxylic compound" as used herein is intended to include both the free alcohols and their esters, and the term "polycarboxylic compound" is intended to include the free acids and their esters.

The terpolymers of high molecular weight which are thus obtained can be drawn into oriented fibers which have improved affinity for dyes, and particularly for cellulose acetate type dyes. The modified polyesters prepared in accordance with this invention retain the desirable physical and chemical properties of the polyesters usually prepared by coreacting the polyhydric alcohol and the polybasic organic acid, and in addition have the improved properties imparted by the presence of the aromatic amino acid derivative groups in the main molecular chain.

The terpolymers of this invention can be prepared in accordance with the well known methods employed for preparing polyesters by reaction of a glycol and a dibasic acid. Thus, the terpolymers are conveniently prepared by heating a mixture of ester of the hydroxyalkyl amino acid, an ester of a dicarboxylic aromatic acid and 25–100 mole percent excess of glycol in the presence of a suitable condensation catalyst such as an amphoteric metal compound. The condensation reaction can be effected at atmospheric pressure under nitrogen and at a temperature of from about 150–300° C. Preferably the reaction is carried out in stages. In the first stage, the reaction mixture is heated at 180–230° C. and atmospheric pressure and the alcohol formed by ester-interchange is distilled out whereby low-molecular weight glycol esters are formed. The temperature is then raised to 250–300° C., depending upon the melting point of the polyester, and some of the excess glycol is distilled out at this time. The final phase of the reaction is carried out under vacuum and with good agitation in order to facilitate the escape of volatile products from the highly viscous melt.

Alternatively, as with other polyesters and copolyesters, the polymer can be prepared by a solid-phase process wherein the described process is carried out under vacuum to form a prepolymer having an inherent viscosity of 0.15–0.30. The prepolymer is then solidified, pulverized to a particle size of about 0.01–0.03 inch, and the pulverized prepolymer heated in vacuum or in an inert gas stream at 200–260° C. until the polymerization has reached the desired stage. In the various methods which can be used for preparing the polymers of the invention, moisture and oxygen are excluded at all stages of the reaction.

The condensation reaction is carried out until the product has a sufficiently high molecular weight to exhibit fiber-forming properties. The fiber-forming stage can be checked by touching the molten polymers with a rod and drawing the rod away. When the fiber-forming stage has been reached, a continuous filament of considerable strength will be pulled from the melt in this manner. This stage is generally reached when the polymer has an intrinsic viscosity of at least 0.4, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and C is the concentration in grams of polymer per 100 cc. of solution. Measurement of the intrinsic viscosity is generally the most convenient method for following the course of the reaction. In most cases, it is usually desirable to continue the reaction until the intrinsic viscosity is above 0.4, and preferably above 0.6. The polymers thus obtained have excellent fiber-forming and cold drawing properties in addition to high melting points, tensile strength, elongation and elastic recovery. These polymers are crystalline, linear polymers which can be formed into fibers which are oriented along their axis.

In practicing the invention, any N-hydroxyalkyl amino acid or ester of the formula

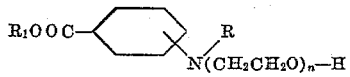

can be used, wherein R is either hydrogen or an alkyl group of 1–6 carbon atoms such as methyl, ethyl, propyl, butyl, hexyl or the like, n is a number of from 1 to 10, and $R_1$ is either hydrogen or an alkyl group of 1–10 carbon atoms. In the preferred practice of the invention R and $R_1$ are desirably either hydrogen or lower alkyl groups of 1–4 carbon atoms. The aromatic nucleus can contain other substituents such as alkyl groups, dialkylamino groups, N,N-dialkyl carboxamido groups, N,N-dialkyl sulfoneamido groups, chlorine groups and similar non-functional groups and such nuclearly substituted hydroxyalkyl amino acid derivatives are within the scope of the invention as described herein and defined in the appended claims. The hydroxyalkyl amino acid compound is used in an amount of 5 to 25 mole percent and preferably 10 to 18 mole percent in the polyester. The amino acid derivatives can be prepared in any desired manner but are conveniently prepared by heating an amino acid ester with ethylene oxide at a temperature of 150–180° C. When one mole of ethylene oxide is used, the reaction is represented by the following equation, in which the ethyl ester is used as a representative ester:

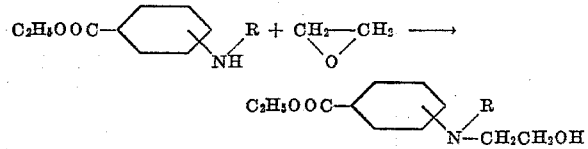

When more than one molar proportion of ethylene oxide is used, the reaction is represented by the following equation:

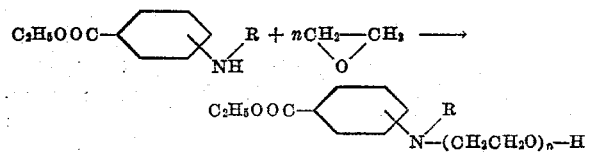

In the preferred practice, the hydroxyalkyl amino acid compound is desirably used in the polyester reaction in the form of a lower alkyl ester such as a methyl, ethyl or butyl ester and hence it is usually not necessary to convert the product of the amino acid ester-ethylene oxide reaction to the free acid. Since the amino acid compounds of the invention contain both a carboxyl group and a hydroxyl group, they function in the same manner as do the bifunctional glycol and dibasic acid reactants and enter directly into the polymer chain. A number of typical N-hydroxyalkyl derivatives of aromatic amino acids are illustrated in the specific examples, but it will be understood that any of the other derivatives as defined herein can be used with equally good results. In many cases, the product of reacting the amino acid ester and ethylene oxide will be a mixture of derivatives of varying length in the —(CH$_2$CH$_2$O)—H chain and therefore have an average composition designated by $n$. The N-hydroxyalkyl amine group (which can also be designated as N-hydroxyethyleneoxy amine groups when $n$ is greater than 1) can be either meta or para to the carboxyl group with equally efficacious results.

In practicing the invention, the amino acid derivative is coreacted with a polybasic organic acid, or an ester thereof, and with a polyhydric alcohol which can be in the form of the free alcohol or esterified as described hereinafter. The reaction is desirably effected in the presence of any of the well known polyester condensation catalysts and preferably an organo-metallic catalyst, a large number of which are described in the copending applications of John R. Caldwell, Serial Nos. 313,061 through 313,071, inclusive, filed October 3, 1952. The catalysts which are preferred for use in practicing this invention are the titanium compounds specifically disclosed in application Serial No. 313,072, tin compounds as disclosed in application Serial No. 313,078, and aluminum compounds as disclosed in application Serial No. 313,077. When such catalysts are employed in preparing the polyester, the esterified polybasic acids and esterified polyhydric alcohols can be readily used instead of the free acids and free polyhydric alcohols. It will, therefore, be understood that this invention includes the use of such acids and alcohols in the form of their esters as well as in the unesterified form, and includes the use of any condensation catalyst or no catalyst in accordance with usual practices.

Thus in practicing the invention any of the well known polybasic organic acids, and particularly the dibasic dicarboxylic acids can be employed for preparation of the modified polymers. These acids include the aliphatic dibasic acids or esters thereof of the formula

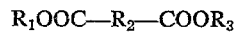

wherein $R_1$ and $R_3$ are either hydrogen or alkyl radicals containing from 1 to 10 carbon atoms, and $R_2$ is an aliphatic hydrocarbon radical. Thus typical aliphatic dibasic dicarboxylic acids which can be employed include oxalic acid, succinic acid, adipic acid, sebacic acid, α,α-dimethyl glutaric acid, dimethyl malonic acid, diglycollic acid, β-oxydipropionic acid, γ-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

The invention is advantageously carried out employing an aromatic dicarboxylic acid or a diester thereof of the formula

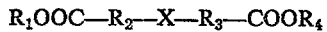

wherein $R_1$ and $R_4$ each represents hydrogen or an alkyl radical containing from 1 to 10 carbon atoms and $R_2$ and $R_3$ each represents (CH$_2$)$_{n-1}$, wherein $n$ is an integer of from 1 to 5 inclusive, and X represents a divalent aromatic radical of the formula

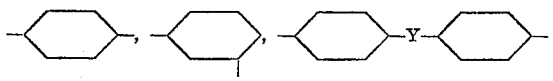

or

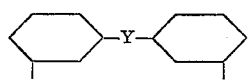

Y representing a radical of the formula $-(CH_2)_{n-1}-$;

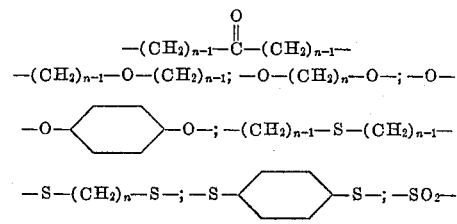

or

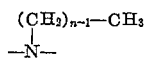

Of such acids, p,p'-sulfonyldibenzoic acid, terephthalic acid, 1,2-di(p-carboxyphenoxy) ethane, 1,2-di(p-carboxyphenyl) ethane and p,p'-diphenic acid are preferred, although any of the other acids or esters of such acids can be employed with good results.

The polyhydric alcohol or ester thereof is preferably an alpha, omega-dioxy compound having the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols. The branched-chain glycols such as 2-methyl-pentanediol and 3-methyl hexanediol can also be used. Other glycols which are suitable include the ether glycols such as diethylene glycol. Thus it is apparent that the dihydroxy compounds used in practicing this invention need not be the free hydroxy compounds when a catalyst of the organo-metallic type is employed to promote the polyester formation. The polyhydric alcohol or ester thereof is desirably employed in an amount such that there is an excess of hydroxy or substituted hydroxy radicals over the amount of carboxyl groups in the polybasic acid or esters and the hydroxyalkyl amino acids employed in the reaction. Generally speaking, the hydroxyl groups are desirably present in an amount of from about 1.3 to about 3 times the amount of carboxyl groups, although even amounts of as much as 10 times or more can be employed in some cases.

It is thus apparent that the N-hydroxyalkyl or N-hydroxypolyethoxy amino acid derivatives described herein can be used for preparing any high molecular weight, high melting linear polyester having fiber-forming properties. For example, the aromatic dicarboxylic acids or diesters thereof which are preferably employed include such materials as β-hydroxyethyl diesters of p,p'-sulfonyldibenzoic acid, p,p'-sulfonyldibenzoic acid dibutyl esters, m,p'-sulfonyldibenzoic acid dipropyl esters, m,m'-sulfonyldibenzoic acid dihexyl esters, methyl terephthalate, hexyl terephthalate, isopropyl terephthalate, and various other esters having the following formulas:

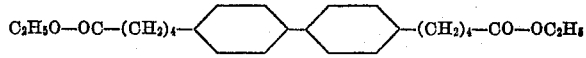
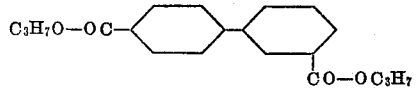
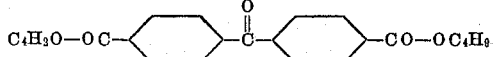
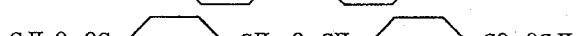
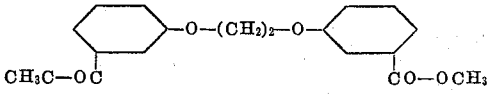
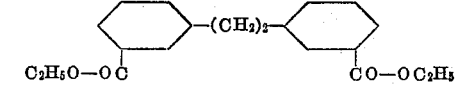
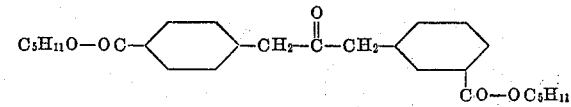
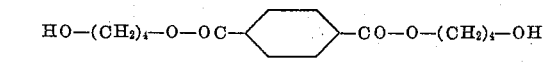
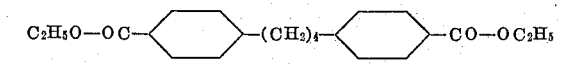
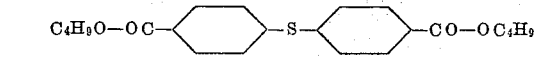
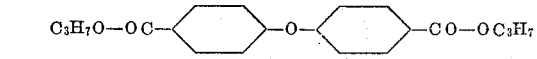
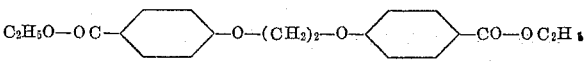

and

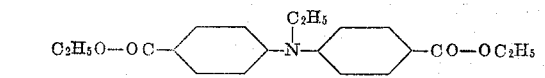

as well as the corresponding free acids.

The dihydroxy compounds which are preferably employed are the straight-chain alkane diols, i. e. the polymethylene glycols, wherein the hydroxy radicals are positioned at the two ends of the alkylene chain. As was indicated, the mono- or di-esters of these glycols can also be employed, such as the acetates, propionates, and butyrates of these and similar glycols. Suitable ether glycols which can be employed instead of the polymethylene glycols or in conjunction therewith include diethylene glycol, triethylene glycol, tetraethylene glycol, bis(4-hydroxybutyl)ether, bis(3-hydroxypropyl) ether, and similar ether glycols.

When preparing high melting polyesters for the manufacture of synthetic fibers, the amount of aliphatic ether glycol is desirably minimized. Furthermore, the aromatic diacids or diesters preferably contain only p,p' linkages when high melting linear polyesters are desired.

When polyesters are prepared in accordance with this invention, the reaction is desirably effected under an inert atmosphere, and preferably under anhydrous conditions. The reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 1 to 6 hours. This permits any alcohol or other volatile material to distill out of the highly viscous polymer melt.

The polymers thus obtained can then be employed in the preparation of fibers or other articles by the usual methods. The polyesters embodying this invention are especially suitable for conversion into fibers by melt spinning methods. The spun fibers are usually drafted and heat treated in accordance with well known practice to give high melting synthetic fibers of excellent tensile strength.

The modified polyesters of this invention can also be employed for making sheets and films, or for the manufacture of molding products and similar materials. The polymers are readily dyed with cellulose acetate type dyes and also shows some affinity for certain classes of acid wool, direct cotton and vat dyes. Although a dyeing assistant is not necessary, one can be used when particularly heavy or dark shades are desired.

The invention is illustrated by the following examples of certain preferred embodiments thereof. The examples are included merely for purposes of illustration and are not intended to limit the scope of the invention unless otherwise specifically indicated.

*Example 1*

Four hundred and twenty grams (1.0 mole) of 4,4'-sulfonyldibenzoic acid dibutyl ester, 42 g. (0.20 mole) of ethyl p-(2-hydroxyethylamino) benzoate, and 160 g. (1.5 moles) of pentamethylene glycol were placed in a reaction vessel equipped with a stirrer, a distillation column, and an inlet for purified nitrogen. A solution of 0.15 g. sodium titanium butoxide in 10 cc. butyl alcohol was added as catalyst. The mixture was stirred at 200–210° C. in a stream of nitrogen. A mixture of butyl and ethyl alcohol distilled as the ester interchange took place. The distillation of the alcohols practically stopped after 1 hour. The temperature was then raised to 260–270° C. and held for 15 minutes. A vacuum of 0.1 mm. was applied and the mixture was stirred at 260–270° for 5–10 minutes to give a polymer having an inherent viscosity of approximately 0.2 as measured in a solution of 60 phenol-40 tetrachloroethane. The molten polymer was removed from the vessel, cooled to room temperature, and granulated to a particle size of 0.01–0.02 inch. The granules were heated at 220–230° C. in a vacuum of 0.05 mm. for 4 hours. The final product had an inherent viscosity of 0.82. It had a crystalline melting point of 250–260° C.

The melted polyester was extruded through a multi-hole spinneret and the fibers were drafted 500% at an elevated temperature. After heat setting, the fibers had a tensile strength of 3.2 grams per denier and an elongation of 36%. They dyed heavily with cellulose acetate dyes. They could be dyed to light shades with acid wool dyes. The hot bar sticking temperature was 210–215° C.

*Example 2*

Four hundred and twenty grams (1.0 mole) of 4,4'-sulfonyldibenzoic acid dibutyl ester, 56 g. (0.25 mole) of ethyl p-[(methyl) (2-hydroxyethyl) amino] benzoate, and 180 g. (1.5 moles) hexamethylene glycol were placed in a reaction vessel as described above. A solution of 0.20 g. lithium aluminum ethylate in 6 cc. of ethyl alcohol was added as catalyst. The mixture was stirred at 200–210° C. in a stream nitrogen. A mixture of ethyl and butyl alcohol distilled as the ester interchange took place. The distillation of the alcohols practically stopped after 1 hour. The temperature was raised to 275–280° C. and held for 30 minutes. A vacuum of 0.5 mm. was applied and the melt was stirred at 275–280° C. for 1 hour. A high viscosity, colorless polyester was obtained. The inherent viscosity, as measured in 60 phenol-40 tetrachloroethane, was 0.74. The melting point of the crystalline polymer, as determined on the hot stage of a polarizing microscope, was 250–260° C.

Fibers spun from this polyester dyed heavily with celluose acetate dyes. They could be dyed to medium shades with acid wool dyes and some direct cotton dyes.

*Example 3*

N-ethyl p-aminobenzoic acid ethyl ester was heated at 160–170° C. with 5 moles of ethylene oxide to give a mixture of hydroxyalkoxy derivatives having the average composition:

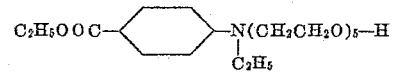

A polyester was made containing 0.20 mole of the above acid, 0.80 mole 4,4'-sulfonyldibenzoic acid, and 0.80 mole pentamethylene glycol. It had a melting point of 230–240° C. Fibers made from the polymer dyed heavily with cellulose acetate dyes and showed some affinity for acid wool dyes.

*Example 4*

A polyester was made having the composition 0.2 mole m-[(ethyl) (2-hydroxyethyl) amino] benzoic acid+0.5 mole 4,4'-sulfonyldibenzoic acid+0.3 mole sebacic acid +0.8 mole tetramethylene glycol. It melted at 250–260°C. and gave strong, elastic fibers that dyed well with cellulose acetate dyes, acid wool dyes, and some direct cotton dyes.

*Example 5*

A polyester was made having the composition 0.15 mole 3-dimethylamino-5[(methyl) (2-hydroxyethyl) amino] benzoic acid, 0.85 mole 4,4'-sulfonyldibenzoic acid, and 0.85 mole pentamethylene glycol. It melted at 250–260° C. and gave strong, elastic fibers that dyed heavily with cellulose acetate dyes and acid wool dyes.

*Example 6*

One hundred and ninety-four grams (1.0 mole) of dimethyl terephthalate, 44 g. (0.2 mole) of ethyl p-[(methyl) (2-hydroxy-ethyl) amino] benzoate, and 126 g. (2.0 moles) of ethylene glycol were placed in a reaction vessel as described in Example 1. A solution of 0.10 g. magnesium aluminum ethoxide in 5 cc. of ethyl alcohol was added as catalyst. The mixture was stirred at 195–200° C. in a stream of nitrogen. The distillation of alcohols had practically stopped after 3 hours. The temperature was then raised to 260–270° C. and held for 1 hour. A vacuum of 0.1 mm. was applied and the melt was stirred at 260–270° C. for 3 hours. The product had an inherent viscosity of 0.78 when measured in a solution of 60 phenol-40 tetrachloroethane. The melting point of the crystalline polymer was 230–240° C. Fibers made from the polymer dyed readily with cellulose acetate dyes and acid wool dyes.

*Example 7*

A copolyester was made having the composition 0.15 mole 3 - dimethylsulfoneamido-5-[(methyl)(2 - hydroxyethyl)amino]benzoic acid, 0.85 mole terephthalic acid, and 0.85 mole ethylene glycol. It melted at 240–250° C. and gave fibers that dyed well with cellulose acetate dyes and acid wool dyes.

Example 8

A polyester was made having the composition 0.25 mole m-[(butyl)(2-hydroxyethyl)amino]benzoic acid, 0.75 mole 4,4'-diphenic acid, and 0.75 mole ethylene glycol. The fibers dyed heavily with cellulose acetate dyes and acid wool dyes, as well as some direct cotton dyes.

Example 9

A copolyester was made having the composition 0.18 mole p-[(methyl)(2-hydroxyethyl)amino]benzoic acid, 0.82 mole 1,2-di(p-carboxyphenoxy)ethane, and 0.82 mole ethylene glycol. It melted at 220-230° C. and gave fibers that dyed well with cellulose acetate dyes, acid wool dyes, and some direct cotton dyes.

Example 10

A copolyester was made having the composition 0.15 mole 3-dimethylcarboxamido-5-[(methyl)(2-hydroxyethyl)amino]benzoic acid, 0.85 mole 1,2-di(p-carboxyphenyl)ethane, and 0.85 mole ethylene glycol. The fibers dyed well with cellulose acetate dyes, acid wool dyes, and some direct cotton dyes.

The polymers embodying the invention can be prepared in accordance with the usual processes for making polyesters, including either batch or continuous processes as desired. The products thus obtained are particularly valuable for preparing synthetic fibers of good mechanical properties and improved affinity for dyes. The modified polyesters, however, can be employed for making clear films which can be employed in the manufacture of photosensitive materials such as either black-and-white or color photographic film. Such films can be prepared in accordance with well known practice, either by deposition of a molten layer onto a suitable film-forming surface, or by deposition from a suitable solvent onto a rotating drum. The modified polymers of this invention can also be used for any of the other applications in which the prior polyesters could be used, since the desirable properties of the copolymer are retained in the terpolymer of this invention.

When using the modified polymers of this invention, any of the well known compounding ingredients which are ordinarily employed in conjunction with synthetic resins can be used, and the polymers can be admixed with similar or dissimilar polymers as desired. Fibers are most conveniently prepared from these polymers by melt-spinning processes, but the polymers can be spun from a solution in a suitable organic solvent such as dimethylformamide or dimethylacetamide if desired, in accordance with processes well known to the art.

Although the invention has been described in considerable detail with particular reference to certain preferred embodiments thereof, variations and modifications can be effected within the spirit and scope of the invention as described hereinabove, and as defined in the appended claims.

We claim:

1. In the preparation of resinous linear polyesters by reacting a dihydroxylic compound with a polycarboxylic compound, the improvement which comprises coreacting at 150-300° C. to an inherent viscosity of at least 0.4, with said dihydroxylic compound and said polycarboxylic compound, an amino compound of the general structure

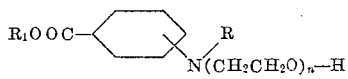

wherein R is selected from the group consisting of hydrogen and alkyl groups of 1-6 carbon atoms, $R_1$ is selected from the group consisting of hydrogen and alkyl groups of 1-10 carbon atoms, and $n$ is a whole integer in the range of 1-10, said amino compound amounting to 5-25 mole percent of the reactants and said dihydroxylic compound amounting to at least 1.3 times the molar amount of said polycarboxylic compound.

2. The method which comprises coreacting at a temperature of 150-300° C. to an inherent viscosity of at least 0.4, a mixture of a polymethylene glycol, a dicarboxylic aromatic acid compound and an amino compound of the general structure

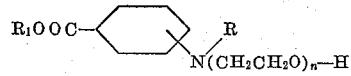

wherein R is selected from the group consisting of hydrogen and alkyl groups of 1-6 carbon atoms, $R_1$ is selected from the group consisting of hydrogen and alkyl groups of 1-10 carbon atoms, and $n$ is a whole integer in the range of 1-10, said amino compound amounting to 5-25 mole percent of said mixture, and said glycol amounting to at least 1.3 times the molar amount of said dicarboxylic acid compound.

3. The method which comprises forming a resinous linear copolyester by coreacting at 150-300° C. to an inherent viscosity of at least 0.4 a polymethylene glycol, 4,4'-sulfonyldibenzoic acid and a compound of the general structure

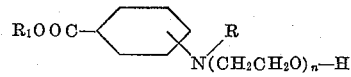

wherein R is selected from the group consisting of hydrogen and alkyl groups of 1-6 carbon atoms, $R_1$ is selected from the group consisting of hydrogen and alkyl groups of 1-10 carbon atoms, and $n$ is a whole integer in the range of 1-10, said compound amounting to 10-18 mole percent of the reactants, and said glycol amounting to at least 1.3 times the molar amount of said acid.

4. The method which comprises forming a resinous linear copolyester by coreacting at 150-300° C. to an inherent viscosity of at least 0.4 a polymethylene glycol, terephthalic acid and a compound of the general structure

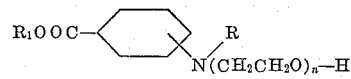

wherein R is selected from the group consisting of hydrogen and alkyl groups of 1-6 carbon atoms, $R_1$ is selected from the group consisting of hydrogen and alkyl groups of 1-10 carbon atoms, and $n$ is a whole integer in the range of 1-10, said compound amounting to 10-18 mole percent of the reactants, and said glycol amounting to at least 1.3 times the molar amount of said acid.

5. The method which comprises forming a resinous linear copolyester by coreacting at 150-300° C. to an inherent viscosity of at least 0.4 a polymethylene glycol, 4,4'-diphenic acid, and a compound of the general structure

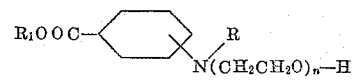

wherein R is selected from the group consisting of hydrogen and alkyl groups of 1-6 carbon atoms, $R_1$ is selected from the group consisting of hydrogen and alkyl groups of 1-10 carbon atoms, and $n$ is a whole integer in the range of 1-10, said compound amounting to 10-18 mole percent of the reactants, and said glycol amounting to at least 1.3 times the molar amount of said acid.

6. The method which comprises forming a resinous linear copolyester by coreacting at 150-300° C. to an inherent viscosity of at least 0.4 a polymethylene glycol, 1,2-di(p-carboxyphenoxy)ethane, and a compound of the general structure

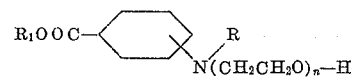

wherein R is selected from the group consisting of hydrogen and alkyl groups of 1–6 carbon atoms, $R_1$ is selected from the group consisting of hydrogen and alkyl groups of 1–10 carbon atoms, and $n$ is a whole integer in the range of 1–10, said compound amounting to 10–18 mole percent of the reactants, and said glycol amounting to at least 1.3 times the molar amount of said ethane compound.

7. The method which comprises forming a resinous linear copolyester by coreacting at 150–300° C. to an inherent viscosity of at least 0.4 ethylene glycol, a dicarboxylic aromatic acid and a compound of the general structure

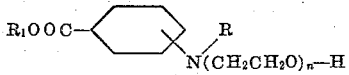

wherein R is selected from the group consisting of hydrogen and alkyl groups of 1–6 carbon atoms, $R_1$ is selected from the group consisting of hydrogen and alkyl groups of 1–10 carbon atoms, and $n$ is a whole integer in the range of 1–10, said compound amounting to 10–18 mole percent of the reactants, and said glycol amounting to at least 1.3 times the molar amount of said acid.

8. The method which comprises forming a resinous linear copolyester by coreacting at 150–300° C. to an inherent viscosity of at least 0.4 a polymethylene glycol, a dicarboxylic aromatic acid and a lower alkyl ester of p-(2-hydroxyethyl amino)benzoic acid, said compound amounting to 10–18 mole percent of the reactants, and said glycol amounting to at least 1.3 times the molar amount of said acid.

9. The method which comprises forming a resinous linear copolyester by coreacting at 150–300° C. to an inherent viscosity of at least 0.4 a polymethylene glycol, a dicarboxylic aromatic acid, and a lower alkyl ester of p-(N-methyl-N-2-hydroxyethyl)amino benzoic acid, said compound amounting to 10–18 mole percent of the reactants, and said glycol amounting to at least 1.3 times the molar amount of said acid.

10. The method which comprises forming a resinous linear copolyester by coreacting at 150–300° C. to an inherent viscosity of at least 0.4 a polymethylene glycol, a dicarboxylic aromatic acid, and a lower alkyl ester of m-(N-ethyl-N-2-hydroxyethyl)amino benzoic acid, said compound amounting to 10–18 mole percent of the reactants, and said glycol amounting to at least 1.3 times the molar amount of said acid.

11. The method which comprises forming a resinous linear copolyester by coreacting at 150–300° C. to an inherent viscosity of at least 0.4 ethylene glycol, 4,4'-sulfonyldibenzoic acid and a lower alkyl ester of p-2-hydroxyethylamino benzoic acid, said compound amounting to 10–18 mole percent of the reactants, and said glycol amounting to at least 1.3 times the molar amount of said acid.

12. The method which comprises forming a resinous linear coplyester by coreacting at 150–300° C. to an inherent viscosity of at least 0.4 ethylene glycol, 4,4'-sulfonyldibenzoic acid and a lower alkyl ester of p-(N-methyl-N-2-hydroxyethyl)amino benzoic acid, said compound amounting to 10–18 mole percent of the reactants, and said glycol amounting to at least 1.3 times the molar amount of said acid.

13. A resinous linear copolyester of a dihydroxylic compound, a polycarboxylic compound and an amino compound of the general structure

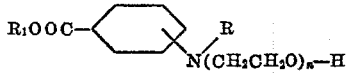

wherein R is selected from the group consisting of hydrogen and alkyl groups of 1–6 carbon atoms, $R_1$ is selected from the group consisting of hydrogen and alkyl groups of 1–10 carbon atoms, and $n$ is a whole integer in the range of 1–10, said copolyester having an inherent viscosity of at least 0.4 and containing 5–25 mole percent of said amino compound.

14. A resinous linear copolyester of a polymethylene glycol, a dicarboxylic aromatic acid and an amino compound of the general structure

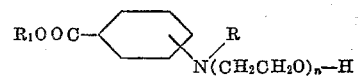

wherein R is selected from the group consisting of hydrogen and alkyl groups of 1–6 carbon atoms, $R_1$ is selected from the group consisting of hydrogen and alkyl groups of 1–10 carbon atoms, and $n$ is a whole integer in the range of 1–10, said copolyester having an inherent viscosity of at least 0.4 and containing 5–25 mole percent of said amino compound.

15. A resinous linear copolyester of ethylene glycol, 4,4'-sulfonyldibenzoic acid and a compound of the general structure

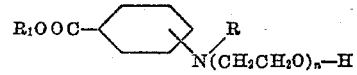

wherein R is selected from the group consisting of hydrogen and alkyl groups of 1–6 carbon atoms, $R_1$ is selected from the group consisting of hydrogen and alkyl groups of 1–10 carbon atoms, and $n$ is a whole integer in the range of 1–10, said copolyester having an inherent viscosity of at least 0.4 and containing 10–18 mole percent of said compound.

16. A resinous linear copolyester of a polymethylene glycol, a dicarboxylic aromatic acid and a lower alkyl ester of p-(2-hydroxyethyl) amino benzoic acid, said copolyester having an inherent viscosity of at least 0.4 and containing 10–18 mole percent of said amino benzoic acid.

17. A resinous linear copolyester of a polymethylene glycol, a dicarboxylic aromatic acid and a lower alkyl ester of N-methyl-N-2-hydroxyethyl amino benzoic acid, said copolyester having an inherent viscosity of at least 0.4 and containing 10–18 mole percent of said amino benzoic acid.

18. A resinous linear copolyester of ethylene glycol, 4,4'-sulfonyldibenzoic acid, and a lower alkyl ester of N-2-hydroxyethyl amino benzoic acid, said copolyester having an inherent viscosity of at least 0.4 and containing 10–18 mole percent of said amino benzoic acid.

19. A resinous linear copolyester of ethylene glycol, terephthalic acid and a lower alkyl ester of N-methyl-N-2-hydroxyethyl amino benzoic acid, said copolyester having an inherent viscosity of at least 0.4 and containing 10–18 mole percent of said amino benzoic acid.

20. A resinous linear copolyester of pentamethylene glycol, 4,4-sulfonyldibenzoic acid lower alkyl ester and ethyl-p-(2-hydroxyethyl amino) benzoate, said copolyester having an inherent viscosity of at least 0.4 and containing 10–18 mole percent of said amino benzoate.

References Cited in the file of this patent

UNITED STATES PATENTS 2,647,104    Shivers            July 28, 1953